(12) United States Patent  
Giaretta

(10) Patent No.: US 7,684,710 B2
(45) Date of Patent: Mar. 23, 2010

(54) DYNAMICALLY ADAPTIVE OPTICAL TRANSCEIVER

(75) Inventor: Giorgio Giaretta, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 763 days.

(21) Appl. No.: 11/243,114

(22) Filed: Oct. 4, 2005

(65) Prior Publication Data

US 2006/0093368 A1 May 4, 2006

Related U.S. Application Data

(60) Provisional application No. 60/623,359, filed on Oct. 29, 2004.

(51) Int. Cl.
*H04B 10/00* (2006.01)
(52) U.S. Cl. .................. 398/135; 398/25; 398/162
(58) Field of Classification Search .............. 398/135, 398/140, 25, 162, 195, 196, 197, 198; 455/88, 455/90
See application file for complete search history.

(56) References Cited

U.S. PATENT DOCUMENTS

| | | | |
|---|---|---|---|
| 5,436,750 A * | 7/1995 | Kawano | 398/10 |
| 5,737,108 A * | 4/1998 | Bunch et al. | 398/135 |
| 6,433,904 B1 * | 8/2002 | Swanson et al. | 398/91 |
| 6,850,709 B1 * | 2/2005 | Gfeller et al. | 398/118 |
| 2003/0011847 A1 * | 1/2003 | Dai et al. | 359/161 |
| 2003/0086140 A1 * | 5/2003 | Thomas et al. | 359/167 |
| 2003/0180041 A1 * | 9/2003 | Azadet | 398/25 |

OTHER PUBLICATIONS

Douglas L. Franzen and G. W. Day, *Measurement of Optical Fiber Bandwidth in the Time Domain*, National Bureau of Standards Technical Note 1019 (Feb. 1980).

* cited by examiner

*Primary Examiner*—Nathan M Curs
(74) *Attorney, Agent, or Firm*—Workman Nydegger

(57) ABSTRACT

Adaptive transmission of optical signals. A dynamically adaptive optical receiver can include a receive optical subassembly (ROSA). The ROSA can include an opto-electronic transducer configured to receive an incoming optical signal from an incoming optical transmission link, circuitry for evaluating one or more properties related to the incoming optical signal, logic for comparing the one or more properties of the incoming optical signal to stored information representing threshold values, and circuitry for controlling a transmission characteristic of an outgoing optical signal based on a result of the comparison.

21 Claims, 2 Drawing Sheets

DYNAMICALLY ADAPTIVE OPTICAL TRANSCEIVER

CROSS-REFERENCE TO RELATED APPLICATIONS

This application claims the benefit of U.S. Provisional Patent Application No. 60/623,359 entitled "DYNAMICALLY ADAPTIVE OPTICAL TRANSCEIVER" filed Oct. 29, 2004, the contents of this application are hereby expressly incorporated by reference herein.

BACKGROUND OF THE INVENTION

1. The Field of the Invention

The present invention relates to systems, methods, and apparatus for adaptively maintaining fiber optic signal integrity within optical communication networks. More specifically, example embodiments of the invention include collecting information about the optical signal transmission and controlling at least one transmission characteristic (such as data transmission rate or encoding types) based on the information to promote high quality transmission.

2. Related Technology

High-speed communication networks have become of even greater importance as the need to transfer large amounts of data continues to increase. Managing the increasing amount of data transmission over networks has created problems where the ability to transfer data at high rates is controlled by various limitations of the components used to transfer the data.

Fiber optic technology is increasingly employed in the transmission of data over communications networks. Networks employing fiber optic technology are known as optical communications networks, and are typically characterized by high bandwidth and reliable, high-speed data transmission.

To communicate over a network using fiber optic technology, fiber optic components such as a fiber optic transceiver are used to send and receive optical data. Generally, a fiber optic transceiver can include one or more optical subassemblies ("OSA") such as a transmit optical subassembly ("TOSA") for sending optical signals, and a receive optical subassembly ("ROSA") for receiving optical signals. More particularly, the TOSA receives an electrical data signal and converts the electrical data signal into an optical data signal for transmission onto an optical network. The ROSA receives an optical data signal from the optical network and converts the received optical data signal to an electrical data signal for further use and/or processing. Both the ROSA and the TOSA include specific optical components for performing such functions.

In particular, a typical TOSA includes an optical transmitter such as a laser diode, for sending an optical signal, and the TOSA further includes a monitor, such as a photodiode, that generates feedback concerning performance parameters of the laser, such as output power. The TOSA also includes a connection for a laser driver, which is used to control the operation of the optical transmitter.

A typical ROSA includes an optical receiver, such as a PIN photodiode or avalanche photodiode ("APD") that receives the optical data signal from the optical network. The optical receiver converts the received optical data signal into an electrical data signal. The ROSA also typically includes a connection to a postamplifier that enables conditioning of the received optical data signal.

Typical prior art transceivers are fixed rate fiber optic transceivers. Fixed rate fiber optic transceivers operate at a fixed rate of data transmission. The rate of transmission may be predetermined, for example, by specific standards, which may depend on the length of the communication link, the quality of the transmission fiber, or may be limited by the other transceivers in the network.

Fixed rate fiber optic transceivers are limited in their ability to optimize the rate of transmission to the limitations of the optical communications link. In one instance, the fixed rate fiber optic transceiver may operate below the abilities of the communication link, thereby, not taking full advantage of the link's ability to transfer data at a higher speed. In another instance, the fixed rate fiber optic transceiver may operate above the abilities of the communication link, resulting in errors in the transmission of data. Therefore, what would be advantageous is to optimize the transmission rate over fiber optic transmission networks so that the large amounts of data may be transferred at the highest rate possible while insuring data transfer integrity.

Dynamic control over the transmission of information has been accomplished over the Internet between modems and Internet routers using negotiation protocols. Generally, when the modem first communicates with the router a negotiation protocol, such as the 802 IEEE standard, is established, and a particular transmission rate is determined. Generally, such a transmission rate over the Internet is determined before transmission of data based on the limitations of the equipment used and the channel capacity. In addition, the modem and the router may dynamically change the transfer rate depending on various conditions, such as weather conditions and changes in the routing of the data packets.

However, adaptive control of the transmission of data has yet to be implemented in the designs of fiber optic network systems. Therefore, one object of this invention is to provide adaptive control of the transmission of data over a fiber optic communications network thereby allowing for optimization of the transfer of data over a fiber optic communication link.

BRIEF SUMMARY OF THE INVENTION

Example embodiments of the present invention concern adaptive transmission of optical signals. An optical receiver is described. The optical receiver can include a receive optical subassembly. The receive optical subassembly can include an opto-electronic transducer configured to receive an incoming optical signal from an incoming optical transmission link. The optical receiver can also include means for evaluating one or more properties related to the incoming optical signal, means for comparing the one or more properties of the incoming optical signal to stored information representing threshold values, and means for controlling a transmission characteristic of an outgoing optical signal based on a result of the comparison.

A dynamically adaptive optical signal communication system is described. The system can include a first host and a first transceiver electrically coupled to the first host. The first transceiver can include a first receive optical subassembly. The first receive optical subassembly can include an optoelectronic transducer configured to receive a first optical signal transmission from a first optical transmission link. The system can include a transmit optical subassembly, which can include an electro-optical transducer configured to transmit a second optical signal to a second optical transmission link, evaluation circuitry configured to evaluate one or more properties of the incoming optical signal transmission, comparison logic for comparing the one or more properties of the incoming optical signal transmission to stored information representing threshold values, and control circuitry configured to control a transmission characteristic of the outgoing optical signal transmission based on the comparison performed by the comparison logic.

A method for dynamic control of an optical transmission is also described. The method can include the acts of receiving an incoming optical signal from an optical transmission link, evaluating one or more properties of the incoming optical signal, comparing the one or more properties of the incoming optical signal to stored information representing threshold values, and controlling a transmission characteristic of an outgoing optical signal transmission based on a result of the comparison.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention are not therefore to be considered to be limiting of its scope, the invention will be described and explained with additional specificity and detail through the use of the accompanying drawings in which.

DETAILED DESCRIPTION OF THE INVENTION

The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention. Detailed descriptions of well-known components and processing techniques are omitted so as not to unnecessarily obscure the invention in detail.

Figure 1:
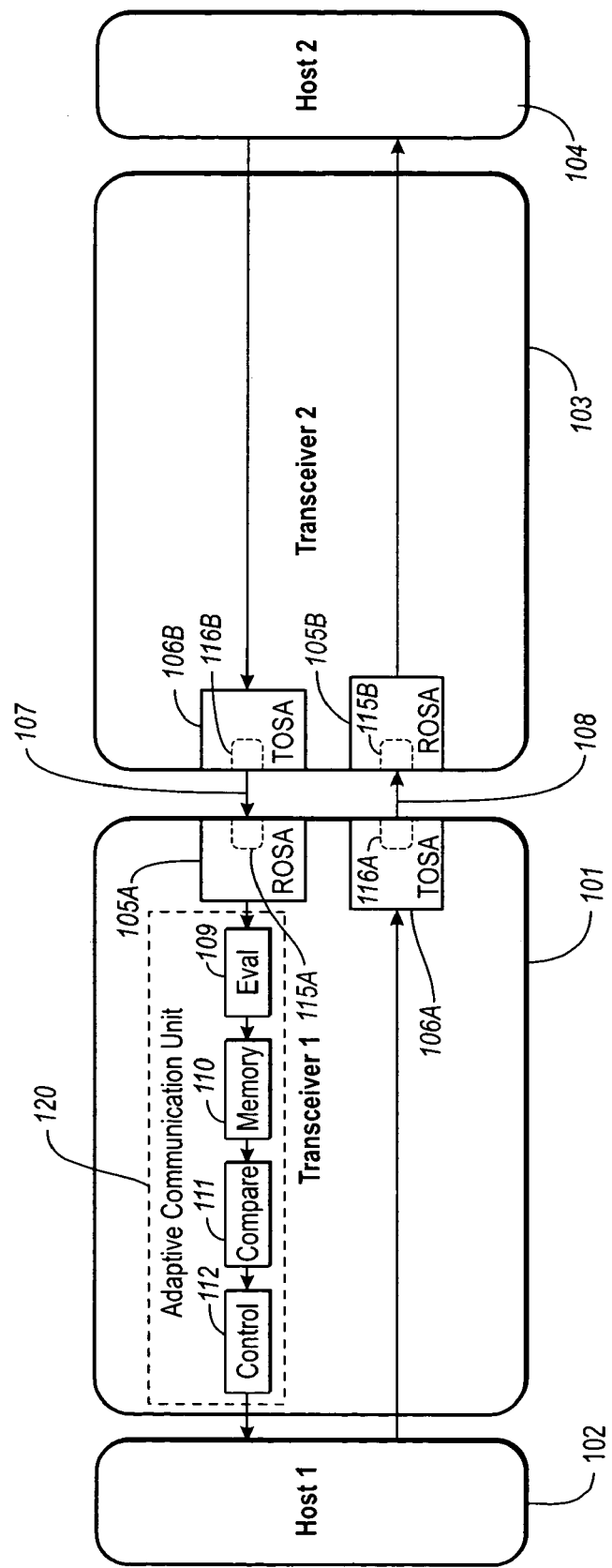
FIG. 1 illustrates an example dynamically adaptive optical signal communication system embodiment according to the present invention.

FIG. 1 illustrates an example dynamically adaptive optical signal communication system embodiment according to the present invention. As shown in FIG. 1, the system can include a first transceiver 101 electrically coupled to a first host system 102 and a second transceiver 103 electrically connected to a second host system 104. Each transceiver can include a ROSA 105A and 105B for receiving an optical signal and a TOSA 106A and 106B for transmitting an optical signal. For instance, the first transceiver 101 can have a ROSA 105A and a TOSA 106A, and the second transceiver 103 can have a ROSA 105B and a TOSA 106B.

According to the embodiment shown in FIG. 1, the ROSA 105A of the first transceiver 101 can be optically coupled to a first optical transmission link 107 to receive an optical signal transmission from the TOSA 106B of the second transceiver 103. Similarly, the ROSA 105B of the second transceiver 103 can be optically coupled to a second optical transmission link 108 to receive an optical signal transmission from the TOSA 106A of the first transceiver 101.

Referring still to FIG. 1, the TOSA 106A and 106B of each transceiver 101 and 103 can include an electro-optic transducer 116A and 116B for converting an electronic signal into an optical signal. For example, TOSA 106A can include electro-optic transducer 116A. Also, TOSA 106B can include electro-optic transducer 116B. Electro-optic transducers may include laser diodes (LDs) or light-emitting diodes (LEDs). LEDs are usually specified as surface-emitters or edge-emitters. LDs may be, for example, Fabry-Parot, distributed feedback, or vertical cavity surface-emitting laser (VCSEL). The ROSA 105 of each transceiver can include an opto-electronic transducer 115 for receiving an incoming optical signal and transforming it into an electrical signal. For example, ROSA 105A can include opto-electronic transducer 115A. Also, ROSA 105B can include opto-electronic transducer 115B. One example opto-electronic transducer is the photodiode, such as the PIN and avalanche photodiode that produces current in response to incident light.

Referring still to FIG. 1, a number of components are shown in the first transceiver making up an adaptive communication unit 120 for receiving the electronic signal from the ROSA 105A and dynamically controlling a transmission characteristic of the outgoing signal transmission. According to the example embodiment shown in FIG. 1, the adaptive communication unit 120 can include evaluation means 109 for evaluating one or more properties related to the incoming optical signal. This evaluation means 109 may include circuitry for evaluating one or more properties related to the incoming optical signal transmission and can be configured to write the one or more properties related to the incoming optical signal to system memory 110. System memory 110 may be any type of computer accessible medium including RAM, Flip-Flops, processor registers, cache, EEPROM or other magnetic storage device, optical storage device, or any other medium which can be used to carry or store desired program code means in the form of computer-executable instructions or data structures and which can be accessed by a processing device or the like. While the system memory 110 is shown inside of the first transceiver, this memory may be located external to the transceiver, inside the host, or may even be excluded where the other steps performed by the adaptive communication unit can be accomplished without the step of writing the information to memory.

Referring still to FIG. 1, the adaptive communication unit 120 includes comparison means 111, such as a circuit including comparison logic, for comparing the one or more properties of the incoming optical signal transmission to stored information representing threshold values. Examples of threshold values include impulse response information, rate of transmission of data information, deterioration of transmitted data information, level of compensation information, error rate information, or bandwidth of the transmission channel information.

The adaptive communication unit 120 shown in FIG. 1 can further include control means 112, such as control circuitry, for controlling a transmission characteristic of an outgoing optical data transmission based on the comparison performed by the comparison means 111. The transmission characteristic controlled may be, for example, the transmission rate of outgoing data, the level or method of coding of an outgoing data transmission, or the level or method of compensation for deterioration conducted on the transmitted data.

The adaptive communication unit 120, including the control means 112, evaluation means 109, memory 110, and comparison means 111, may be included in whole or in part inside the first transceiver 101 in electrical communication between the ROSA 105 and the first host 102 as shown, integrated as a part of the first host 102, or be a component distinct from both the first transceiver 101 and first host 102. The adaptive communication unit may be coupled directly to the TOSA 106 and control the TOSA 106 directly, or may provide information to the first host 102 or some other internal or external processor, device, or circuit to control a transmission characteristic and/or for further processing. These components of the adaptive communication unit 120 may also be integrated in whole or in part with each other into a single circuit, unit, or device, or any other component of the system.

In some embodiments, it may be advantageous for the control means 112 to interact with the second transceiver 103 or the second host 104 to dynamically control the characteristic of outgoing data transmission. A negotiation protocol may be used to determine, for example, a transmission rate, level of encoding, or level of equalization for future transmissions between the two transceivers.

While the system has been shown with only two host-transceiver communication nodes in direct communication with each other, it should be appreciated that any number of host-transceiver communication nodes may be used as may be common or advantageous in an optical communication network.

Figure 2:
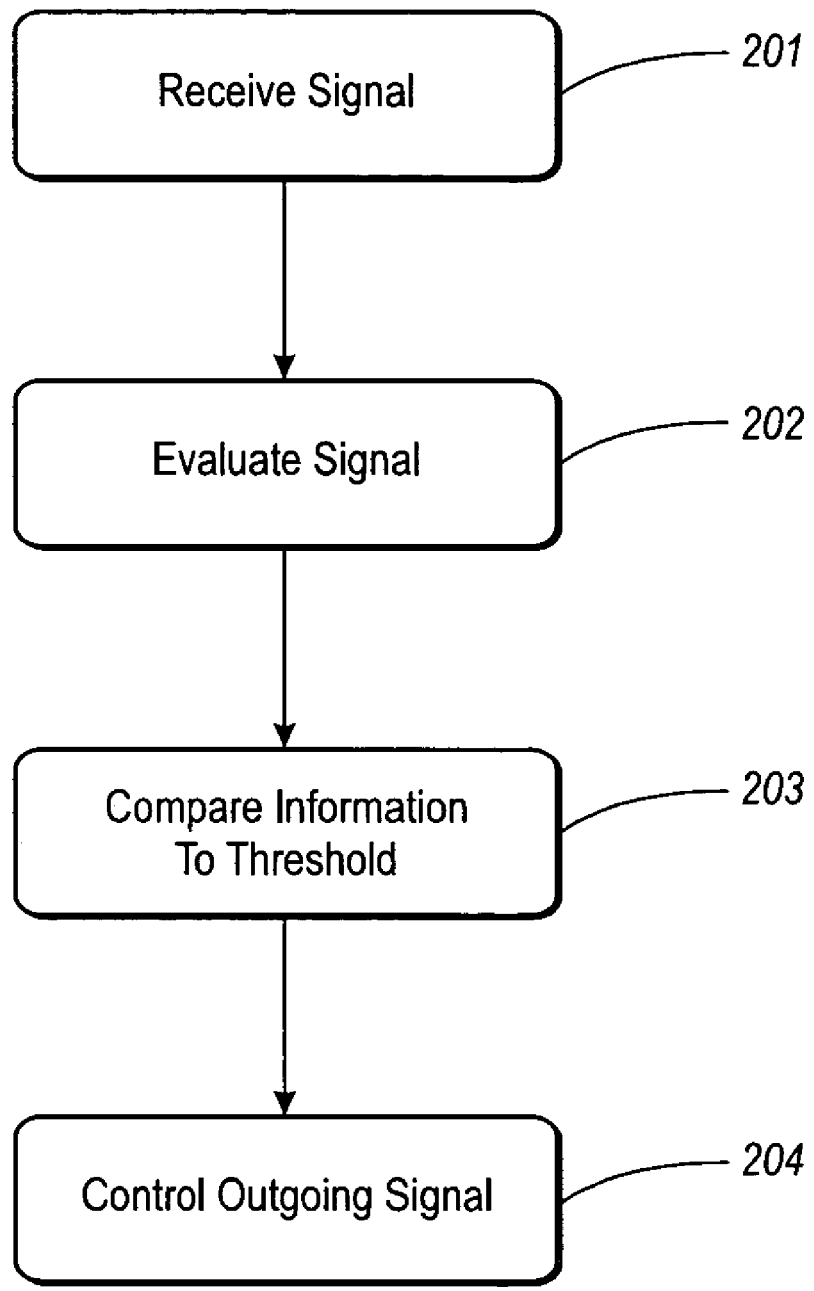
FIG. 2 is a flow diagram illustrating a method for dynamic control of an optical signal transmission characteristic according to one embodiment of the present invention.

Referring now to FIG. 2, a flow diagram is shown illustrating an example of dynamic control of an optical signal transmission characteristic according to several embodiments of the present invention. These acts can be practiced by many different apparatus, which are encompassed within the scope of the present invention. According to FIG. 2, an incoming optical signal transmission can be received from an optical transmission link and converted to an electronic signal equivalent of the optical signal by an opto-electronic transducer (act 201).

Evaluation means, such as evaluation circuitry, can be configured to receive at least a portion of the electronic signal and evaluate one or more properties related to the incoming optical signal transmission (act 202). Examples of the one or more properties that may be evaluated include the bandwidth of the optical transmission channel, the level of signal deterioration, the level of compensation for signal deterioration, an impulse response characteristic, or errors in the optical transmission signal received for example using forward error correction codes.

Evaluation of the bandwidth of the optical transmission channel may be measured by using an equalizer integrated circuit. For example, evaluation of the level of signal deterioration or level of compensation for signal deterioration may be achieved using an equalizer integrated circuit or equalizer logic. One type of signal deterioration that may be evaluated is dispersion. Dispersion occurs where different components of a signal travel through a transmission medium at different speeds, and therefore arrive at the transceiver at different times. Dispersion may result in pulse broadening and intersymbol interference. Equalization techniques included in a communications channel compensates for signal degradation caused by the optical medium. Several techniques, both in the optical domain and the electrical domain have been implemented to compensate for dispersion.

According to an embodiment of the present invention, an equalizer integrated circuit or equalizer logic implementing these techniques can be used to evaluate the level of signal deterioration, bandwidth of the channel, or level of compensation for signal deterioration caused by dispersion. Dispersion can be chromatic dispersion or modal dispersion. Interference can be intersymbol interference, connector interference, and polarization mode dispersion. It should be appreciated that other types of signal deterioration or interference other than dispersion may also be evaluated as would be appreciated by one of ordinary skill in the art Evaluation of an impulse response characteristic may also be achieved by evaluation circuitry that is configured to receive an impulse response and evaluate one or more properties related to the impulse response received. An impulse response is the response of the system to an impulsive input signal. An impulse in this sense is any signal whose time integral is undistinguishable from a unit step. Impulse response is connected to bandwidth by a Fourier transform as is known to one of ordinary skill. Evaluation of the impulse response can also provide information about the level of signal deterioration, bandwidth of the channel, level of compensation needed for the signal deterioration, or the like.

Evaluation of errors in the signal received may also be conducted by a forward error correction decoder. A forward error correction decoder can be configured to receive at least a portion of the electronic signal and evaluate forward error correction codes contained in the incoming optical signal transmission. According to one embodiment of the present invention employing forward error correction logic, a digital information source sends a data sequence comprising k (any number) bits of data to an encoder. The encoder inserts redundant (or parity) bits, thereby outputting a longer sequence of n code bits called a codeword. On the receiving end, codewords can be used by a suitable decoder to extract the original data sequence.

Codes can be designated with the notation (n, k) according to the number of n output code bits and k input data bits. The ratio k/n is called the rate, R, of the code and is a measure of the fraction of information contained in each code bit. For example, each code bit produced by an encoder contains ½ bit of information. Another metric often used to characterize code bits is redundancy, expressed as (n−k)/n. Codes introducing large redundancy (that is, large n−k or small k/n) convey relatively little information per code bit. Codes that introduce less redundancy have higher code rates (up to a maximum of 1) and convey more information per code bit. Evaluation of errors in the signal can be determined by the forward error correction decoder or other device using forward error correction logic. Evaluation of the forward error correction codes can provide information about signal deterioration, bandwidth of the channel, compensation needed for the signal deterioration, or the like. The tests discussed herein, as well as others, can be used to evaluate the signal (act 202)

It should be appreciated that the methods of evaluating a property of the optical signal transmission discussed herein are neither mutually exclusive nor exhaustive. Additional methods for evaluating a property of the optical signal transmission that would be known to one of ordinary skill should be considered within the scope of the present invention. For example, several currently available periodicals, printed publications, and patents known to one of ordinary skill disclose many methods and apparatuses for evaluation of signals. One example of many currently available is "Measurement of Optical Fiber Bandwidth in the Time Domain" NBS Technical Note 1019, U.S. Department of Commerce, by Douglas L.

Franzen and G. W. Day (February 1980). Thus, additional mechanisms, such as circuits, for these methods of evaluating such transmission characteristics are known to one of ordinary skill in the art and thus need not be explained here in further detail.

Information related to the evaluation of the one or more properties of the incoming signal may be written to system memory. System memory may be any computer accessible medium such as RAM, Flip-Flops, processor registers, cache, EEPROM, or other magnetic storage device, optical storage device, or any other medium which can be used to carry or store desired program code means in the form of computer-executable instructions or data structures and which can be accessed by a processing device or the like. System memory may be excluded where the evaluation and comparison steps can be performed without the step of writing the information to memory.

After a property of the incoming optical signal transmission is evaluated, comparison logic can be used to compare the information related to the one or more properties of the incoming optical signal transmission to stored threshold values (act 203). Stored threshold values may represent, for example, the optimum rate of transmission for the specific communication link, an acceptable level of deterioration of the signal, an acceptable level of compensation for the deterioration of the transmitted signal, acceptable characteristics of an impulse response received, current transmission bandwidth, or acceptable error rate in the signal received. Mechanisms, such as circuits, for comparing two values are also known to one of skill in the art and thus need not be explained in further detail here.

A transmission characteristic of an outgoing optical data transmission can be controlled by a control means (act 204), such as control circuitry, based on the comparison of the information related to the one or more properties of the incoming optical signal transmission to the stored threshold values. The transmission characteristic of the outgoing optical data transmission may be, for example, the rate of transmission of data, the level of coding (e.g. compression) of the data transmitted, or the level of equalization, reconstruction, or compensation for deterioration of the transmitted signal.

The transmission characteristic, such as the rate of transmission of outgoing data may be increased, decreased, or maintained based on the comparison of the information related to the signal transmission property evaluated to the stored threshold value. For example, where the number of errors in the signal received is greater than the threshold value, the rate of transmission of data may be reduced until the number of errors in the signal received is less than or equal to the threshold value. On the other hand, where the number of errors in the signal received is less than the threshold value, the rate of transmission of data may be increased until the number of errors in the signal received is equal to the threshold value. In this example, the threshold value may relate to an acceptable level of errors in the signal received.

The level of coding of the outgoing data may also be increased, decreased, or maintained based on the comparison of the property evaluated to the stored threshold value. For example, where forward error correction is used in the transmission of data, the redundancy of the coding of the data may be increased, decreased, or maintained based on the evaluation of the number of errors in the signal received. Large redundancy is advantageous because it reduces the likelihood that all of the original data will be wiped out during a single transmission. On the down side, the addition of redundancy will generally increase the transmission bandwidth or the message delay (or both). Similar to forward error correction coding, compression of data coding may be implemented. The level of compression of data coding may also be varied based on the comparison of the property evaluated to the stored threshold value.

The level of equalization, reconstruction, or compensation for deterioration of the transmitted signal may also be increased, decreased, or maintained based on the comparison of the property evaluated to the stored threshold value. For example, based on the comparison of the incoming signal property to the stored threshold value, the level of equalization for dispersion deterioration of the signal may be increased, decreased, or maintained; or additional equalization, reconstruction, or compensation techniques may be conducted on the signal transmitted.

It should be appreciated that the methods of controlling a transmission characteristic of an outgoing optical data transmission discussed herein are neither mutually exclusive nor exhaustive. Additional methods for controlling a transmission characteristic of an outgoing optical data transmission that would be obvious to one of ordinary skill should be considered within the scope of the present invention. In addition, it should be appreciated that combinations of the steps or acts described herein, and methods, steps, and acts not described, but that would be obvious to one of ordinary skill, are also anticipated as within the scope of the present invention. For example, the rate of transmission of an outgoing signal, the level of coding in a forward error correction code applied to an outgoing signal, and level of equalization conducted on an outgoing signal may be implemented simultaneously in any combination, and controlled independently or dependently based on the comparison of the evaluated property of the incoming signal to the stored threshold value.

The invention may be embodied in other specific forms without departing from its spirit or essential characteristics. The described example embodiments and specific features are to be considered in all respect only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical assembly comprising:
    a receive optical subassembly comprising:
        an opto-electronic transducer configured to receive an incoming optical signal from an incoming optical transmission link;
        means for evaluating one or more properties related to the incoming optical signal;
        means for comparing the one or more properties of the incoming optical signal to stored information representing threshold values, wherein the one or more properties related to the incoming optical signal comprises the bandwidth of the incoming optical transmission link, wherein the one or more properties related to the incoming optical signal further comprise properties of an impulse response; and
        means for controlling a transmission characteristic of an outgoing optical signal based on a result of the comparison.

2. The optical assembly of claim 1, wherein the evaluation means comprises circuitry configured to evaluate one or more properties related to the incoming optical signal, the comparison means comprises logic for comparing the one or more properties of the incoming optical signal to stored information representing threshold values, and the control means comprises circuitry configured to control a transmission characteristic of an outgoing optical data signal based on a result of the comparison performed by the comparison logic.

3. The optical assembly of claim 2 further comprising: system memory, wherein the evaluation circuitry is configured to write information related to the one or more properties to the system memory.

4. The optical assembly of claim 3, wherein the system memory comprises RAM, Flip-Flops, processor registers, or cache.

5. The optical assembly of claim 1, wherein the evaluation means comprises an equalizer integrated circuit.

6. The optical assembly of claim 1, wherein the comparison means comprises at least one of equalization logic or forward error correction logic.

7. The optical assembly of claim 1, wherein the one or more properties related to the incoming optical signal further comprise a level of deterioration of the incoming optical signal.

8. The optical assembly of claim 1, wherein the transmission characteristic comprises a rate of an outgoing data transmission.

9. A dynamically adaptive optical transceiver comprising the optical assembly of claim 1, and further comprising:
a transmit optical subassembly comprising:
an electro-optical transducer configured to transmit the outgoing optical signal to an outgoing optical transmission link.

10. The optical assembly of claim 1, wherein the one or more properties related to the incoming optical signal further comprise an error rate of the data transferred over the optical transmission link.

11. The optical assembly of claim 1, wherein the evaluation means comprises a forward error correction decoder.

12. The optical assembly of claim 1, wherein the transmission characteristic comprises coding of the outgoing data transmission.

13. The optical assembly of claim 1, wherein the transmission characteristic comprises a level of compensation for deterioration conducted on the outgoing data transmission.

14. A dynamically adaptive optical signal communication system comprising:
a first host; and
a first transceiver electrically coupled to the first host, the first transceiver comprising:
a first receive optical subassembly comprising:
an opto-electronic transducer configured to receive a first optical signal transmission from a first optical transmission link;
a first transmit optical subassembly comprising:
an electro-optical transducer configured to transmit a second optical signal to a second optical transmission link;
evaluation circuitry configured to evaluate one or more properties of the incoming optical signal transmission;
comparison logic for comparing the one or more properties of the incoming optical signal transmission to stored information representing threshold values, wherein the one or more properties related to the incoming optical signal transmission comprises impulse response information; and
control circuitry configured to control a transmission characteristic of the outgoing optical signal transmission based on the comparison performed by the comparison logic.

15. The optical communication system of claim 14, further comprising:
a second host; and
a second transceiver electrically coupled to the second host, the second transceiver comprising:
a second receive optical subassembly comprising:
an opto-electronic transducer configured to receive the second optical signal transmission from the second optical transmission link; and
a second transmit optical subassembly comprising:
an electro-optical transducer configured to transmit the first optical signal to the first optical transmission link.

16. The optical communication system of claim 14, wherein the first transceiver further comprises system memory and wherein the evaluation circuitry is configured to write information describing the one of more properties of the incoming optical signal transmission to the system memory.

17. The optical communication system of claim 14, wherein the evaluation circuitry comprises at least one of an equalizer integrated circuit or a forward error correction decoder.

18. The optical communication system of claim 14, wherein the comparison logic comprises at least one of equalization logic or forward error correction logic.

19. The optical communication system of claim 14, wherein the one or more properties related to the incoming optical signal transmission comprises at least one of the level of deterioration of the incoming optical signal, the error rate of the data transferred over the optical transmission link, or the bandwidth of the optical transmission link.

20. The optical communication system of claim 14, wherein the transmission characteristic comprises at least one of the rate of an outgoing data transmission from the first transceiver, coding of an outgoing data transmission from the first transceiver, or the level of compensation for deterioration conducted on the transmitted data from the first transceiver.

21. The optical communication system of claim 14, wherein the first transceiver transmits a negotiation signal prior to transmitting the second optical signal.

* * * * *